United States Patent
Kumaran et al.

(10) Patent No.: US 7,158,804 B2
(45) Date of Patent: Jan. 2, 2007

(54) UPLINK SCHEDULING FOR WIRELESS NETWORKS

(75) Inventors: Krishnan Kumaran, Scotch Plains, NJ (US); Lijun Qian, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 536 days.

(21) Appl. No.: 10/305,614

(22) Filed: Nov. 27, 2002

(65) Prior Publication Data

US 2004/0102202 A1    May 27, 2004

(51) Int. Cl.
*H04B 7/00* (2006.01)
(52) U.S. Cl. .................. 455/515; 455/500; 455/452.2; 370/411
(58) Field of Classification Search ................ 455/515, 455/500, 454, 450, 452.1, 453.3, 445, 561, 455/453, 452.2; 370/210, 468, 411
See application file for complete search history.

(56) References Cited

U.S. PATENT DOCUMENTS

| | | | |
|---|---|---|---|
| 6,072,784 | A | 6/2000 | Agrawal et al. |
| 6,885,868 | B1 * | 4/2005 | Naim et al. ............... 455/452.1 |
| 2003/0028659 | A1 * | 2/2003 | Mesarina et al. ........... 709/231 |
| 2003/0125040 | A1 * | 7/2003 | Walton et al. ............... 455/454 |
| 2004/0001429 | A1 * | 1/2004 | Ma et al. ..................... 370/210 |
| 2004/0017825 | A1 * | 1/2004 | Stanwood et al. .......... 370/468 |

OTHER PUBLICATIONS

Kumaran et al., "Uplink Scheduling in CDMA Systems," 1-13, (2002).
G. Caire et al., "Achievable Rates in Multi-Antenna Broadcast," Allerton Conference (2000).
A. Jalali et al., "Data Throughput of CDMA-HDR a High Efficiency-High Data Rate Personal Communication Wireless System," in Proc. of IEEE VTC, vol. 3 (2000).
P. Patel et al., "Analysis of a Simple Successive Interference Cancellation Scheme in a DS/CDMA System," IEEE Journal on Selected Areas in Comm., vol. 12, No. 5 (1994).
A. Sampath and J. Holtzman, "Access Control of Data in Integrated Voice/Data CDMA Systems: Benefits and Tradeoffs," IEEE Journal on Selected Areas in Comm., vol. 15, No. 8 (1997).
D. N. C. Tse, "Optimal Power Allocation over Parallel Gaussian Broadcast Channels," Dept. of Electrical Engineering and Computer Sciences, International Symposium on Information Theory, Ulm, Germany (1997).
S. Verdu, "Multiuser Detection," Cambridge University Press, Chapter Seven, Decision-Driven Multiuser Detectors, 344-351 (1998).

* cited by examiner

*Primary Examiner*—Matthew D. Anderson
*Assistant Examiner*—Tan Trinh

(57) ABSTRACT

Mobiles are sorted by using a first metric and one or more of the sorted mobiles are selected. A second metric is determined using the selected sorted mobiles, and mobiles are selected to transmit during a time period based on the second metric. Multiple embodiments are disclosed using these steps and exact or approximate solutions as to which mobiles should transmit may be determined. By way of example, the first metric may be a weighted marginal rate and the second metric may be an objective function. An uplink proportional fair technique is presented in which, for example, either a single "strong" mobile or a group of "weak" mobiles may be selected to transmit during a single time period. In addition, techniques are presented for determining uplink scheduling when there is partial orthogonality in Walsh codes, modeled by an orthogonality factor, assigned to mobiles. Techniques are also presented for optimal uplink scheduling for uplink mobile transmissions in a single cell with successive interference cancellation.

35 Claims, 7 Drawing Sheets

UPLINK SCHEDULING FOR WIRELESS NETWORKS

FIELD OF THE INVENTION

The present invention relates generally to communications over wireless networks, and, more particularly, to uplink data transfer over wireless networks.

BACKGROUND OF THE INVENTION

In a wireless network, such as a network employing code division multiple access (CDMA) techniques, mobiles communicate with a base station. A mobile is any device suitable for communicating with a base station in the wireless network. For instance, a mobile might be a cellular phone, a personal digital assistant, or a laptop computer. A large amount of research has been performed to determine how to efficiently transmit data in the downlink direction, that is, from the base station to the mobiles.

There is not much research for the uplink direction, which is from the mobiles to the base station. This is true because, for cellular systems in particular, data flow has primarily been on the downlink. A base station needs to be able to transmit a lot of data to many mobiles. For instance, for a mobile that supports Internet capabilities such as browsing, a mobile being used to browse the Internet will receive much more data than what the mobile transmits. And voice information, which passes through the uplink, is a relatively small amount of information, particularly if the voice is compressed. Graphics-intensive Internet pages contain many times the amount of information as contained in normal compressed voice information.

However, mobiles are being created that not only transmit voice information on the uplink, but also transmit other information. For example, some new cellular phones allow digital pictures to be transmitted to the base station. It is expected that, as time progresses, the amount of information transmitted from mobiles to the base station will increase.

A need therefore exists for techniques that accommodate higher amounts of information from mobiles.

SUMMARY OF THE INVENTION

The present invention provides uplink scheduling for mobiles in a wireless system, such as a wireless system employing CDMA techniques.

In one aspect of the invention, uplink scheduling is provided by sorting mobiles requesting transmission in a time period based at least in part on a first metric and selecting one or more of the sorted mobiles. A second metric is determined using the selected sorted mobiles, and mobiles are selected to transmit during a time period based on the second metric. Multiple embodiments are disclosed using these steps.

In one illustrative embodiment, for example, a weighted marginal rate may be used as the first metric to sort mobiles. For instance, the weighted marginal weight could be $$v_i = \frac{w_i}{\bar{\alpha}_i} g_i(\bar{\alpha}_i),$$

where $w_i$ is a weight for mobile i, $\bar{\alpha}_i$ is a highest normalized signal to noise ratio (NSNR) for mobile i, and $g_i(\bar{\alpha}_i)$ is a transmission rate occurring at $\bar{\alpha}_i$. Weights can be queue length, delay, corresponding percentiles for the queue length or delay, or other criteria. An objective function, such as $$\max \sum_{i=1}^{N} w_i g_i(\alpha_i)$$

for N mobiles, is used as the second metric to determine which mobiles should transmit in a time period. Multiple marginal rates are determined that correspond to multiple determined objective functions. In this example, multiple marginal rates and multiple determined objective functions correspond to a number of cumulative NSNRs. The best objective function is selected from the multiple determined objective functions. The selected mobile or mobiles corresponding to the best objective function are the mobile or mobiles selected to transmit during the time period.

Another illustrative embodiment is referred to herein as an uplink proportional fair (UPF) embodiment. In an example of a UPF embodiment, the first metric is a weighted marginal rate such as, for example, $$v_i = \frac{R_i^0}{\bar{R}_i},$$

where $R_i^0$ is the communication rate with no interference from mobiles and $\bar{R}_i$ is the average communication rate of mobile i, updated through a low pass filter in each scheduling interval. The second metric is an objective function such as, for example, $$O \triangleq \sum_{j < i} R_i,$$

and the selected mobile or mobiles are those mobiles used to determine the objective function and that do not cause the objective function to decrease. In other words, rates corresponding to selected mobiles are added to the objective function. Once the objective function decreases when a rate, corresponding to a newly added mobile, is added to the objective function, then the mobile or mobiles selected before the newly added mobile are the selected mobile or mobiles that will transmit in the time period.

Certain embodiments herein tend to allow either a single "strong" mobile or a group of "weak" mobiles to transmit during a single time period. Strong and weak mobiles can be differentiated, for instance, by received power or received signal to interference ratio (SIR).

In another aspect of the invention, techniques are presented for determining uplink scheduling when there is partial orthogonality in Walsh codes, for CDMA systems, assigned to mobiles. Partial orthogonality is traditionally modeled by means of an orthogonality factor, f, which specifies the fraction of power transmitted to other mobiles that appears as direct interference to a particular mobile. Techniques are presented for determining uplink scheduling when, for example, the orthogonality factor is between zero and one-half.

In a further aspect of the invention, techniques are presented for optimal uplink scheduling for mobile transmissions in a single CDMA cell with successive interference cancellation (SIC). SIC involves decoding information from a current mobile after subtracting out the interference from all previously decoded mobiles, thus making the current mobile immune to the previously decoded mobiles. In one embodiment, mobiles are ordered by queue length, for instance longest to shortest queue lengths. In general, all mobiles transmit at full power and at rates determined by SIC rate formulas. The mobiles are decoded based on the selected ordering. In another embodiment, all mobiles transmit simultaneously. Mobiles are classified based on a property of the mobile, such as a probability of being correctly decoded, a received power, or a received signal to interference ratio. Mobiles above a predetermined threshold for the property are decoded using the SIC technique described above or conventional SIC techniques. Mobiles below a predetermined threshold for the property are decoded using multi-user detection techniques.

DETAILED DESCRIPTION

Figure 1:
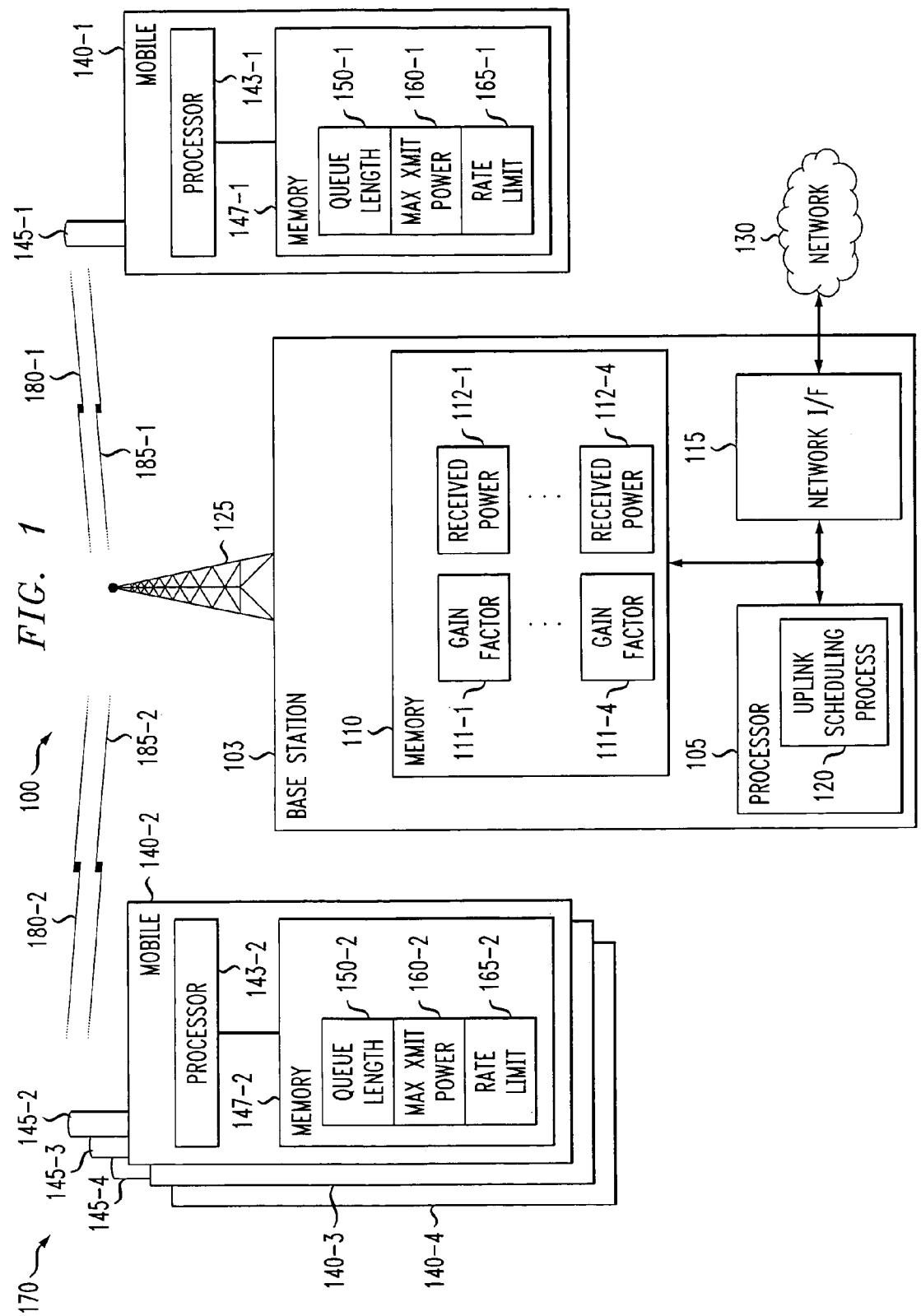
FIG. 1 is a block diagram of a portion of a wireless system, in accordance with a preferred embodiment of the invention.

For ease of reference, the present disclosure is divided into sections, as follows: Introduction; Feasible Rate Region for Single Cell Uplink Scheduling; Optimal Uplink Scheduling; Role of Partial Orthogonality in Uplink Scheduling; Low-Complexity Approximation Techniques; and Successive Interference Cancellation (SIC) Techniques.

I. Introduction

Data scheduling in wireless networks is a widely studied topic due at least in part to an impending widespread availability of high speed wireless data services in third generation (3G) systems. For natural reasons associated with the expected traffic characteristics, most of the previous research has focused on the downlink, i.e., base station to mobile. The downlink traffic is currently expected to be dominated by web browsing and file downloads. As a result, current wireless systems employ highly asymmetric link designs with "skinny" uplinks and "fat" downlink pipes. However, it has also been pointed out that there could be a proportional increase in uplink traffic in the form of acknowledgments and feedback, along with the growth of other services, including file transfers such as image or data uploads, which require high data rates on the uplink. These considerations have resulted in some research on the subject of uplink scheduling, although this research is small compared to the literature on downlink scheduling. There is also some amount of related work from an information theoretic point of view, on the subject of wireless multi-access channels.

However, the previous work addresses different problems, and does not offer the solutions provided below to maximize uplink scheduling gains while meeting rate or quality of service (QoS) requirements among competing mobiles. For instance, the conventional approach of maximizing rate sum or signal to interference ratio (SIR) sum is often a poor option in practice, since it mostly benefits mobiles in favorable locations while ignoring the performance seen by the disadvantaged mobiles. As for conventional information theoretic approaches, these approaches deal extensively with various issues such as optimal power control, ergodic capacity, and delay limited capacity, but generally with constraints on long term average transmit power and assuming continuously backlogged mobiles with known channel statistics. While the need to eliminate channel statistics assumptions is important, long term averages used in the conventional information theoretic approaches do not reflect the limitations of most current mobiles, which are based more on instantaneous power limits. Also, the assumption of continuous backlog for all mobiles is unrealistic, as data traffic is typically bursty in nature.

By contrast, aspects of the present invention focus on scheduling with instantaneous constraints on transmit power and without the assumptions used in the information theoretic approaches. Additionally, aspects of the present invention can use feedback-based knowledge of channel conditions and mobile queues in order to improve uplink rates.

In this disclosure, the problem of optimal uplink scheduling of uplink mobile transmissions in a single CDMA cell, with a single base station, is examined and solutions are presented that can determine an optimal solution to the uplink scheduling. Additionally, approximate solutions to the optimal uplink scheduling are developed. Optimal uplink scheduling produces an exact solution for uplink transmissions, whereas the approximate solutions produce inexact solutions. In other words, a maximum amount of data is transmitted on the uplink when using an optimal uplink scheduling technique. Exceeding the maximum amount of data is not possible. However, optimal uplink scheduling embodiments are typically computationally intensive and sub-optimal uplink scheduling embodiments often produce suitable scheduling with less computation. Moreover, using the optimal uplink scheduling techniques herein may produce less than optimal results, due to rounding and other computational errors.

In one or more illustrative embodiments, it is assumed that a system using the techniques of the present invention operates in a time-division, CDMA manner, with time-period scheduling of CDMA transmissions, assisted in certain embodiments by periodic feedback of channel and congestion information through control channels. Although embodiments of the present invention will be described in relation to CDMA networks, the embodiments of the present invention are applicable to other wireless networks using uplink scheduling. The base station then controls mobile transmission rates via downlink signaling in certain embodiments. Moreover, it can be observed that optimal techniques for uplink scheduling provided herein are reasonably well approximated by some very simple scheduling techniques, also described below, that may be implemented with modest effort in 3G systems.

Turning now to FIG. 1, a portion 100 of a CDMA network is shown. In the analyses given below, there are N mobiles, where N can be quite large. In the example of FIG. 1, N=4 for space and simplicity reasons. Illustratively, portion 100 is a cell of a CDMA network, and portion 100 comprises a base station 103 in communication with mobiles 140-1 through 140-4 (collectively, mobiles 140) and network 130. Base station 103 comprises an antenna 125, a processor 105, a memory 110, and a network interface 115. Processor 105 comprises an uplink scheduling process 120. Memory 110 comprises gain factors 111-1 through 111-4 (collectively, gain factors 111) and received powers 112-1 through 112-4 (collectively, received powers 112), one for each mobile 140. Each mobile 140 comprises a processor 143 coupled to a memory 147, and an antenna 145. Each memory 147 in each mobile comprises a queue length 150, a maximum transmit power 160, and a rate limit 165, each of which may be used in embodiments of the present invention. Each processor 143 runs one or more programs (not shown) that provide uplink and downlink communications with base station 103. Each mobile 140 communicates with the base station 103 through an uplink 180 and a downlink 185. In this example, there is a set 170 of weak mobiles 140-2 through 140-4 and a strong mobile 140-1. It should be noted that FIG. 1 is used for illustrative purposes and is used to describe embodiments of the invention. However, FIG. 1 is in no way limiting.

Network 130 is any suitable network for connecting to a base station 103, such as the Internet, an asynchronous transfer mode (ATM) network or a plain old telephone system (POTS) network. Uplink scheduling process 120 comprises one or more of the methods shown in FIGS. 4, 5 and 7 through 12, which are used to determine appropriate uplink schedules for mobiles 140. Uplink scheduling process 120 will communicate, in certain embodiments, the uplink schedule to mobiles 140 by using the downlink 185.

Uplink scheduling process 120 may reside in memory 110 and be loaded into processor 105 during execution. Alternatively, uplink scheduling process 120 may be partially or completely implemented in hardware, such as implemented in processor 105. Processor 105 may be singular or distributed and may be any type of device adapted to perform instructions, such as a digital signal processor, gate array, programmable device, or general use processor. Memory 110 may be singular or distributed and may comprise static or dynamic memory or a combination thereof. Memory 110 may be at least in part magnetic or optical memory rather than electronic memory.

In certain embodiments, mobiles 140 transmit information to the base station 103. For instance, queue lengths 150 are used to provide measures of how much information the mobile 140 has yet to send. Mobiles 140 can transmit pilot signals to base station 103, from which the base station 103 can determine gain factors 111. The gain factors 111 and maximum transmit powers 160 are used, in certain embodiments, to determine received powers 112 from the mobiles 140. Alternatively, maximum transmit powers 160 may be assumed. Rate limits 165 are used to determine whether a mobile can transmit only at a particular rate, and rate limits 165 will affect received powers 112, as described in more detail below.

The techniques, for certain embodiments, described herein for determining optimal uplink scheduling as well as the proposed approximations given below possess an intuitively appealing property that is consistent with traditional observations about wireless transmission. This property is that it is advantageous for mobiles with weak channels to transmit simultaneously, and for mobiles with strong channels to transmit singly. The intuition behind this is that the added interference at the base station 103 from simultaneous transmissions of weakly received mobiles (e.g., set 170 of weak mobiles) is small compared to the extraneous interference, and thereby does not affect the mobile SIRs and data rates significantly. On the contrary, for mobiles (e.g., strong mobile 140-1) received strongly at the base, the penalty in terms of SIR and data rate with simultaneous transmission can be quite significant. Thus, FIG. 1 illustrates, for certain embodiments herein, a strong mobile 140-1 and a set 170 of weak mobiles 140-2 through 140-4, from which a mobile or mobiles to transmit in the next time period are selected. The "strong" and "weak" mobiles are determined by the technique (e.g. described in reference to FIGS. 4, 5, 7 through 10, and 12) determining which mobiles are to transmit during a time period. In general, a "weak" mobile is a mobile with low received power at the base even when transmitting at peak transmit power, and a "strong" mobile with high received power at the base station 103. For instance, a mobile with received power of zero decibels could be considered strong and all other mobiles considered weak. However, other criteria may be used to differentiate weak and strong mobiles.

Additionally, embodiments of the present invention optimize mobile QoS measures (e.g., queue lengths or delays) using knowledge about instantaneous queue length (or delay) status of a mobile and instantaneous channel conditions experienced by the mobile. As a byproduct, aspects of the present invention also provide a greater degree of fairness, in addition to improved throughput, compared to widely used scheduling algorithms. Furthermore, the effect of limited orthogonality among the mobile codes is also considered below through an examination of the orthogonality factor (f), which, it is shown below, tends to encourage simultaneous mobile transmission due to reduced interference. Based on observations from the optimal techniques described below, a modification of the widely used PF algorithm, referred to herein as Uplink PF (UPF), is described below that demonstrates substantial performance improvement in simulations. UPF uses the same information as PF, but is designed to encourage simultaneous transmission by "weak" mobiles, which greatly improves performance.

As is known in the art, methods herein may be embodied as one or more programs placed on an article of manufacture, which comprises a machine readable medium containing one or more programs which, when executed, implement the steps of the methods.

Figure 2:
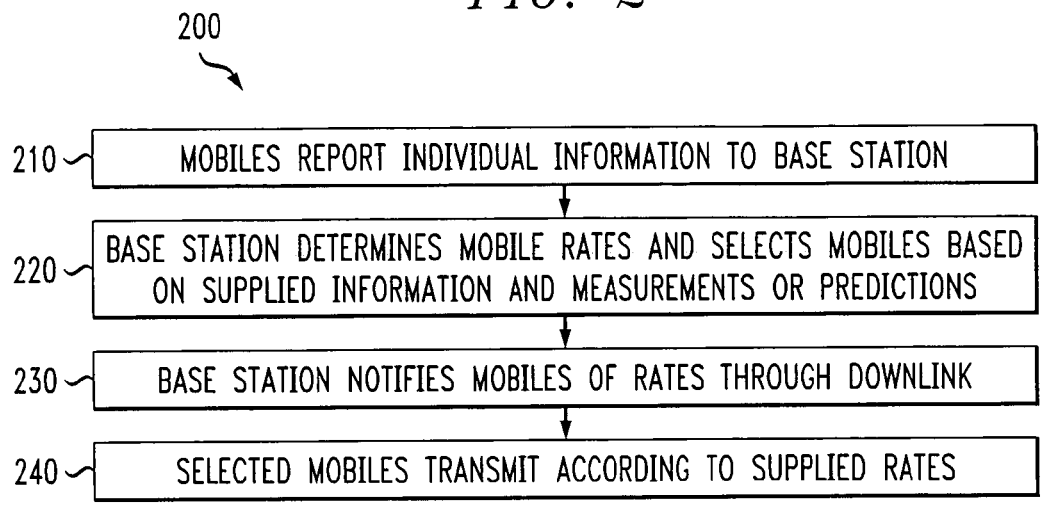
FIG. 2 is a flow chart of a method for uplink scheduling, in accordance with a preferred embodiment of the invention.

Turning now to FIG. 2, a method 200 for uplink scheduling is shown. Method 200 is performed by uplink scheduling process 120 in order to determine appropriate uplink mobile rates and to inform mobiles as to which mobiles should transmit during a time period. Method 200 begins when one or more of the mobiles report individual information to the base station. For instance, queue lengths, maximum transmit powers, and rate limits may be communicated by the mobiles to the base station. The communication in step 210 is generally periodic.

Additionally, various embodiments shown in detail below may or may not need all of the possible information. For instance, maximum transmit power may be assumed for many CDMA systems. The maximum transmit power can either be reported by the mobile once upon call-origination, or simply taken as a standard feature in mobiles. Usually the mobiles have a standard, fixed, limited maximum transmit power. Similarly, mobiles are generally not held to any rate limit. However, there may be situations when one or more mobiles have an instantaneous upper rate limit that may not let the mobiles utilize all their transmit power. In this case, the base station should be made aware of this by feedback, via the rate limit that is transmitted from a mobile to the base station, to compute the maximum received power.

It should also be noted that the type of information supplied from the mobiles to the base station depends on the embodiment of the present invention. For example, in the optimum uplink scheduling techniques, weights (e.g., queue lengths), gain factors, and maximum power limits are beneficial. In the SIC techniques shown in reference to FIG. 11, the queue length is beneficial.

Figure 4:
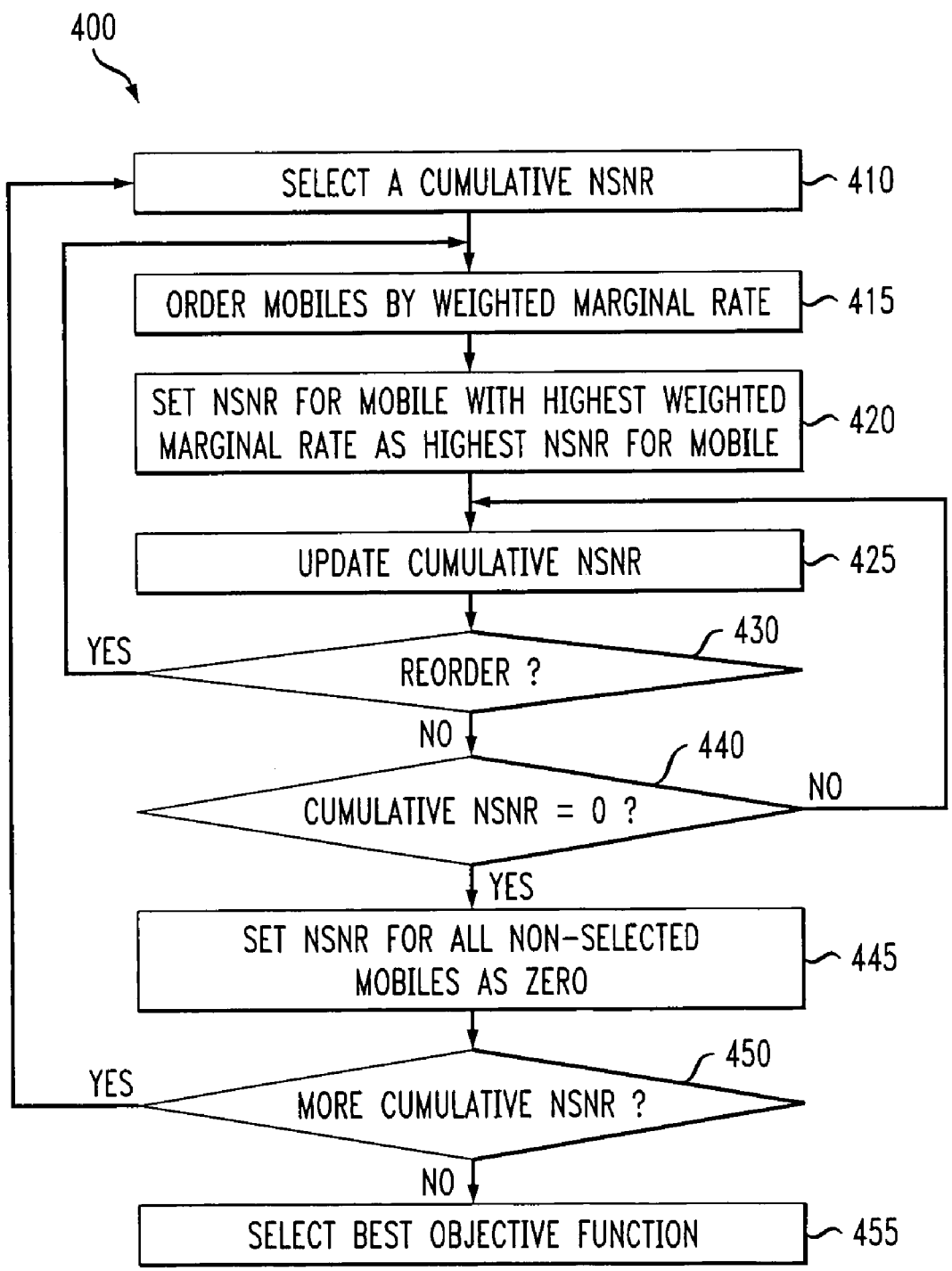
FIG. 4 is a flow chart of an exemplary method that determines uplink mobile rates and produces an exact solution for the uplink mobile rates when an orthogonality factor is between one-half and one, in accordance with a preferred embodiment of the invention.
Figure 5:
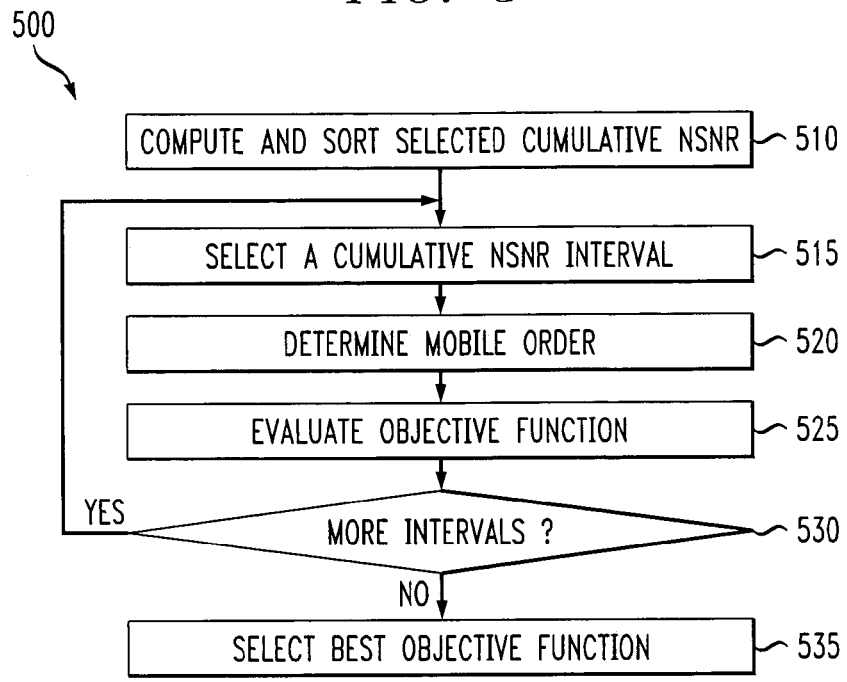
FIG. 5 is a flow chart of an alternate method that determines uplink mobile rates and also produces an exact solution for the uplink mobile rates when an orthogonality factor is between one-half and one, in accordance with a preferred embodiment of the invention.
Figure 7:
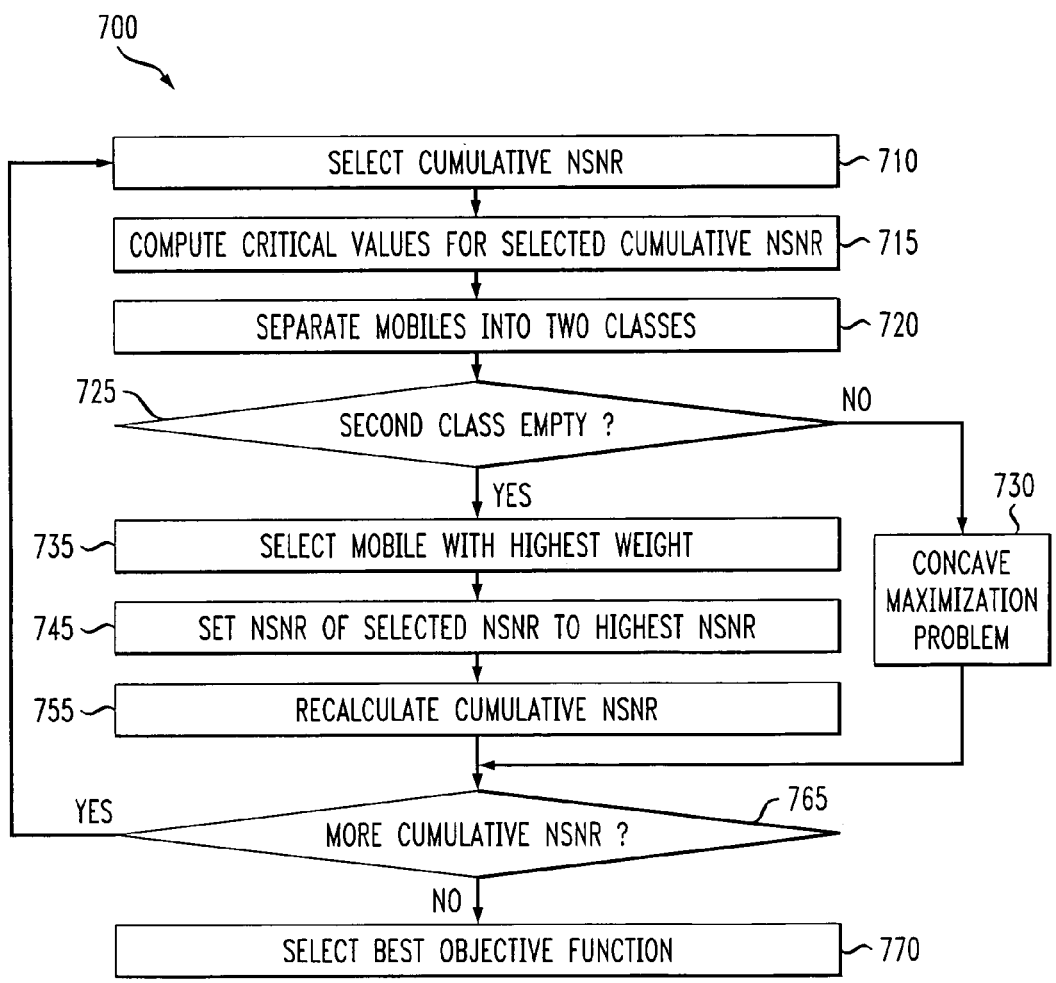
FIG. 7 is a flow chart of an exemplary method that determines uplink mobile rates and produces an exact solution for the uplink mobile rates when an orthogonality factor is between zero and one-half, in accordance with a preferred embodiment of the invention.
Figure 8:
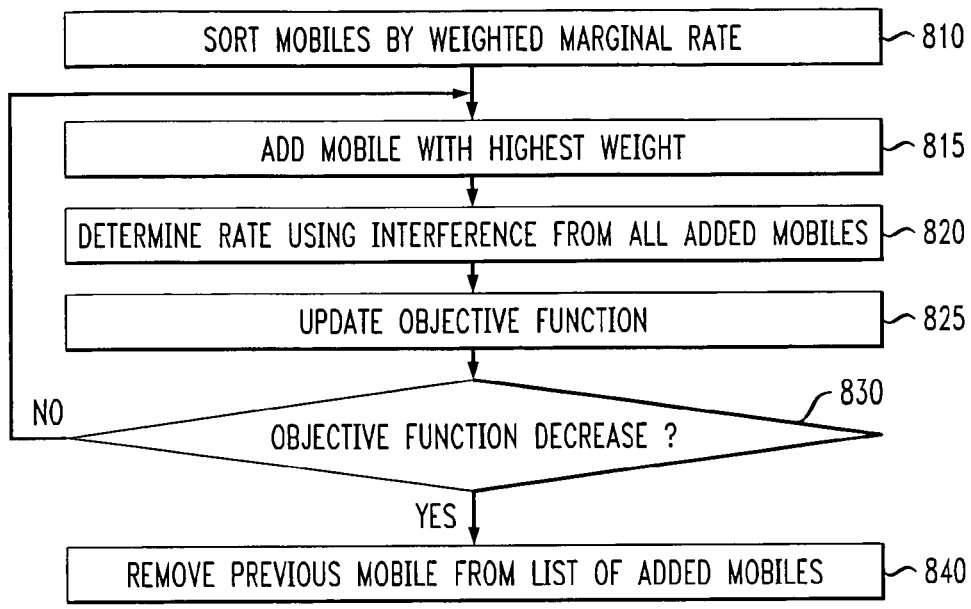
FIG. 8 is a flow chart of an exemplary method that determines uplink mobile rates and produces an approximate solution for the uplink mobile rates when an orthogonality factor is between one-half and one, in accordance with a preferred embodiment of the invention.
Figure 9:
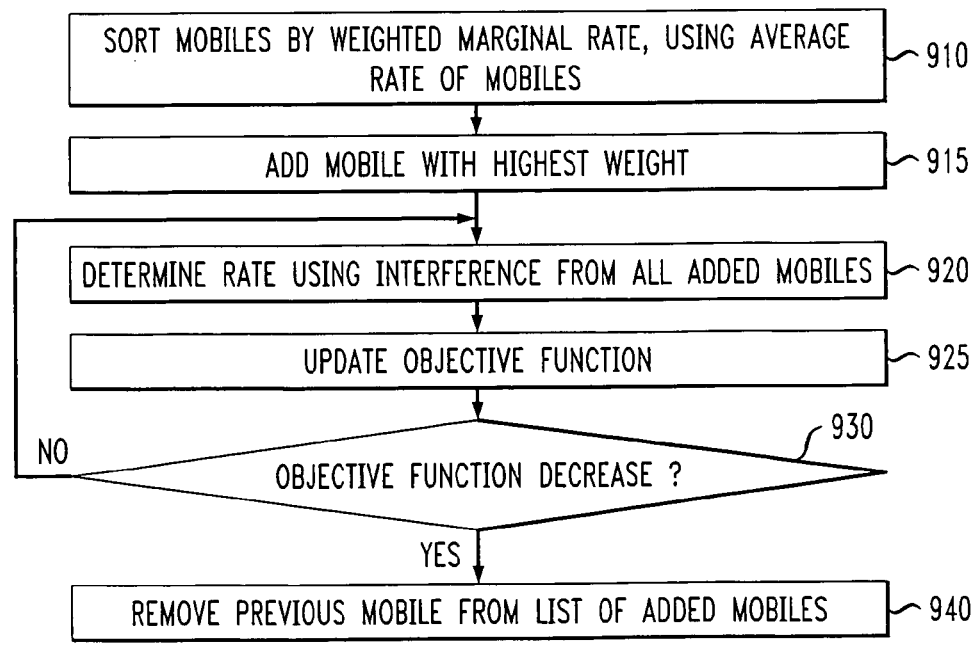
FIG. 9 is a flow chart of an exemplary proportional fair (PF) method, more specifically referred to as uplink PF (UPF) method herein, that determines uplink mobile rates and produces an approximate solution for the uplink mobile rates when an orthogonality factor is between one-half and one, in accordance with a preferred embodiment of the invention.
Figure 10:
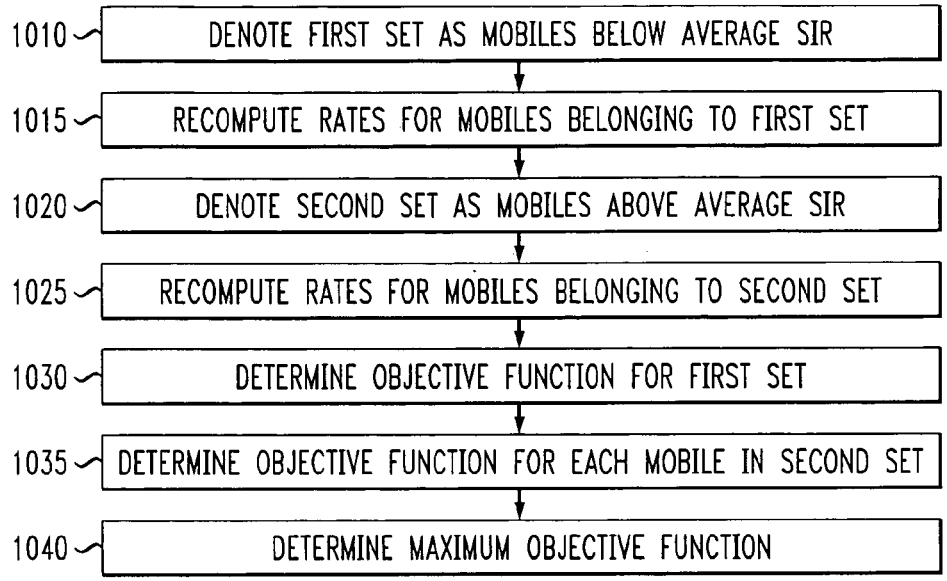
FIG. 10 is a flow chart of an exemplary average signal to interference ratio (SIR) method that determines uplink mobile rates and produces an approximate solution for the uplink mobile rates when an orthogonality factor is between one-half and one, in accordance with a preferred embodiment of the invention.

In step 220, the base station determines the mobile rates and selects mobiles to transmit in a particular time period based on the supplied information and measurements (e.g., calculated received power) or predictions (e.g., an estimated maximum transmit power). Techniques for determining mobile rates and selecting mobiles to transmit are described in figures as follows: FIGS. 4 and 5 describe optimal uplink scheduling determination; FIG. 7 describes optimal uplink scheduling determination when the orthogonality factor is less than one-half; FIG. 8 describes a sub-optimal uplink scheduling determination; FIG. 9 describes a sub-optimal uplink scheduling determination using a modified PF methodology; FIG. 10 describes a sub-optimal uplink scheduling determination using an average SIR methodology; and FIGS. 11 and 12 describe sub-optimal uplink scheduling determinations using SIC methodology. As described above, optimal uplink scheduling techniques exactly determine uplink schedules. Nonetheless, optimal uplink scheduling techniques may be impractical for certain real-time applications, and sub-optimal uplink scheduling techniques are therefore beneficial. Additionally, the performance and throughput loss due to the sub-optimal uplink scheduling techniques is generally small.

In step 230, the base station notifies the mobiles of the selected rates. The notification occurs on the downlink and may occur in different ways. For instance, only those mobiles selected for transmission in the particular time period (generally, the next time period) may be communicated with over the downlink. The rates for the mobile or mobiles may be transmitted to only those mobiles selected. Alternatively, all mobiles may be communicated to during one downlink communication. For certain embodiments of the present invention, each mobile selected to transmit during a time period will transmit at maximum power and at a rate determined in step 220. This occurs in step 240, when the selected mobiles transmit, at the rates supplied by the base station, during the time period. Generally, the time period is the next time period for transmission.

The rest of the present disclosure begins with the derivation of the feasible SNR region on the uplink in Section II, implicitly with the orthogonality factor equal to one (i.e., f=1). This is followed by a formulation of the optimal scheduling problem in terms of the mobile rates and the feasible SNR region in Section III. It is then shown how the optimal solution can be obtained with low computational effort in Section III. The influence of choosing other values for f∈[0,1] is described in Section IV, and a procedure is given to solve for the optimal uplink schedule when 0<f<0.5. This is followed by a discussion of approximate scheduling algorithms derived from the optimal solution in Section V. Finally, in Section VI, uplink scheduling is described when SIC is used.

II. Feasible Rate Region for Single Cell Uplink Scheduling

Consider the uplink of a single CDMA cell serving N mobiles. Let $P_i$ be the instantaneous received power and $\gamma_i$ the SIR of the ith mobile. For simplicity, $P_i$ is expressed in units of the total interference I+σ, where σ is thermal noise and I is the total instantaneous interference from other sources, such as other cells in the network. In order to meet the SIR requirement of all mobiles, for each i the following must be true:

$$\frac{P_i}{\sum_{j\in[1,...,N], j\neq i} P_j + 1} \geq \gamma_i. \quad (1)$$

The feasible SIR vectors γ specified by Equation (1) above have been derived in many previous papers. See, for instance, A. Sampath and J. Holtzman, "Access Control of Data in Integrated Voice/Data CDMA Systems: Benefits and Tradeoffs," IEEE Journal on Selected Areas in Comm., vol. 15, no. 8 (1997), the disclosure of which is hereby incorporated by reference. The derivation is recalled below to point out the specific results utilized later in embodiments of uplink scheduling techniques. Given the peak received power of the ith mobile, $\overline{P}_i$, computed using the path gain as $G_i$, and peak transmit power $\overline{P}_i^t$ as $\overline{P}_i = \overline{P}_i^t G_i$, a change of variables to $$\theta_i = \frac{P_i}{\overline{P}_i}$$

allows Equation (1) to be rewritten as the following:

$$\frac{\theta_i \overline{P}_i}{\sum_{j \in \{1,\ldots,N\}, j \neq i} \theta_j \overline{P}_j + 1} \geq \gamma_i. \quad (2)$$

A given SIR vector γ, is feasible if Equation (2) can be satisfied with equality with $0 \leq \theta_i \leq 1$ for all i. The solutions to the set of linear equations $$\frac{\theta_i \overline{P}_i}{\gamma_i} = \sum_{j \in \{1,\ldots,N\}, j \neq i} \theta_j \overline{P}_j + 1$$

are first examined, which can be further rewritten as the following:

$$\theta_i \overline{P}_i (1 + \frac{1}{\gamma_i}) = \sum_{j \in \{1,\ldots,N\}} \theta_j \overline{P}_j + 1. \quad (3)$$

It can be seen by inspection that the solutions are of the form $$\theta_i \overline{P}_i (1 + \frac{1}{\gamma_i}) = C,$$

where C is a global parameter. The value of $C^{\gamma_i}$ can be obtained by substituting the postulated solution in Equation (3) to obtain $$C = C \sum_j \frac{\gamma_j}{\gamma_j + 1} + 1,$$

which gives the final solution as the following:

$$\theta_i = \frac{\gamma_i}{\overline{P}_i (1 + \gamma_i)} \frac{1}{\left[1 - \sum_{j \in \{1,\ldots,N\}} \frac{\gamma_j}{1 + \gamma_j}\right]}. \quad (4)$$

Defining $$\alpha_i = \frac{\gamma_i}{1 + \gamma_i}$$

the following can be seen:

$$\theta_i = \frac{\alpha_i / \overline{P}_i}{1 - \sum_j \alpha_j}. \quad (5)$$

Clearly, $0 \leq \alpha_i < 1$. Since $0 \leq \theta_i \leq 1$ is required, the set of Equations (5) result in the following:

$$\sum_j \alpha_j + \frac{\alpha_i}{\overline{P}_i} \leq 1 \quad \forall i. \quad (6)$$

Note the simple linear form of the feasible SIRs in the set of Equations (6) in terms of the $\alpha_i$, about which the following observations are made.

When there is no power limitation, i.e. $\overline{P}_i$ are arbitrarily large for each i, Equations (6) collapse into the single condition $$\sum_j \alpha_j \leq 1,$$

which is the simple, single-cell version of the well-known stability condition for uplink power control. In this case, as is shown later, the feasible SIR region has a fully concave boundary which is dominated by its convex hull composed by time-sharing single mobile transmissions.

When the power limitations are severe, i.e., $\overline{P}_i$ are small for each i, the constraints of Equations (6) approach independent box constraints $0 \leq \alpha_i \leq \overline{P}_i$ for each i, and simultaneous transmission is favored.

For intermediate cases, where some $\overline{P}_i$ are large and others small, the optimal scheduling strategy involves time-sharing over different subsets of simultaneously transmitting mobiles. An interesting observation regarding the optimal strategy, that is described below, is that all transmitting mobiles should transmit at full power, i.e. at $\overline{P}_i$, for certain embodiments of the present invention.

In the subsequent section, the last item above is analyzed, which is the most likely practical scenario, to determine the optimal transmitting sets.

III. Optimal Uplink Scheduling

The overall scheduling approach described herein for optimal uplink scheduling uses a weighted sum of mobile rates that is maximized for each scheduling interval. This choice has provable stability properties in various contexts involving data scheduling and resource allocation. The weights may be chosen to optimize one of many possible performance measures, including average queue length, delay, or corresponding percentiles, and other similar criteria. Below, uplink scheduling techniques using queue length are described in more detail, but the weight can be any possible performance measure. A version of a methodology that guarantees queue stability, i.e., boundedness of queue lengths when feasible, is specified as the rate choice that satisfies the following:

$$R^* = \arg\max_{R \in \mathcal{R}} Q \cdot R,$$

where R, Q are rate and queue vectors of the mobile set respectively, and $\mathcal{R}$ is the rate region, or the set of feasible rate vectors. Minimum or maximum instantaneous rate guarantees may be satisfied by restricting the rate region $\mathfrak{R}$ appropriately. Thus, the general optimal scheduling problem can be solved if one has a technique to solve for R* in the following:

$$R^* = \arg\max_{R \in \mathcal{R}} w \cdot R, \quad (7)$$

for arbitrary given weights w.

To formulate Equations (7) for uplink CDMA scheduling, a relationship between rate and SIR, as $$R \stackrel{\Delta}{=} f(\gamma),$$

is required for each mobile. It is assumed that this relationship is concave in the argument $\gamma$, as is the case for the Shannon formula for the additive white Gaussian noise (AWGN) channel where $R=\beta\log(1+\gamma)$, where $\beta$ is the bandwidth of the channel. Since Equations (6) are linear in $$\alpha \stackrel{\Delta}{=} \gamma/(1+\gamma),$$

it is more convenient to consider the R, $\alpha$ relationship which is now convex for the Shannon formula $g(\alpha)=\beta\log[1/(1-\alpha)]$. The variable $\alpha$ is called a normalized signal to noise ratio (NSNR) herein. Equation (7) then becomes the following optimization problem:

$$\max \sum_{i=1}^{N} w_i g_i(\alpha_i), \quad (8)$$

subject to the following:

$$\sum_{j=1}^{N} \alpha_j + \frac{\alpha_i}{\overline{P}_i} \le 1, \alpha_i \ge 0 \quad \forall i. \quad (9)$$

Typically $g_i(\cdot)$ and $g(\cdot)$ are identical functions, as is the case for the Shannon formula, but the results herein remain unaffected even if the functions were all different, as long as the functions stay convex. Before discussing methods to solve Equations (8), (9), some useful properties of the optimal solution are observed.

It can be proven that the optimal schedule has the property that each transmitting mobile beneficially transmits at full power, i.e., $P_i=0$ for some subset S of the mobiles and $P_i=\overline{P}_i$ for the complementary set $\overline{S}$. A proof is shown in K. Kumaran and L. Qian, "Uplink Scheduling in CDMA Systems," 2002 Allerton Conference, Monticello, Ill. (October 2002), the disclosure of which is hereby incorporated by reference.

It can also be proven, as shown in "Uplink Scheduling in CDMA Systems," that without power constraints, i.e. $\overline{P}_i=\infty \forall i$, the optimal schedule picks a single mobile at each scheduling interval.

A solution to Equations (8) and (9) is now presented, and the solution determines the subset S,$\overline{S}$ for each scheduling interval. Defining $$\Lambda \stackrel{\Delta}{=} \sum_{j=1}^{N} \alpha_j,$$

Equations (8) and (9) are rewritten as the following:

$$\max \sum_{i=1}^{N} w_i g_i(\alpha_i), \quad (10)$$

subject to the following:

$$\sum_{j=1}^{N} \alpha_j = \Lambda, \text{ and} \quad (11)$$

$$0 \le \alpha_i \le \overline{P}_i(1-\Lambda) \quad \forall i.$$

Figure 3:
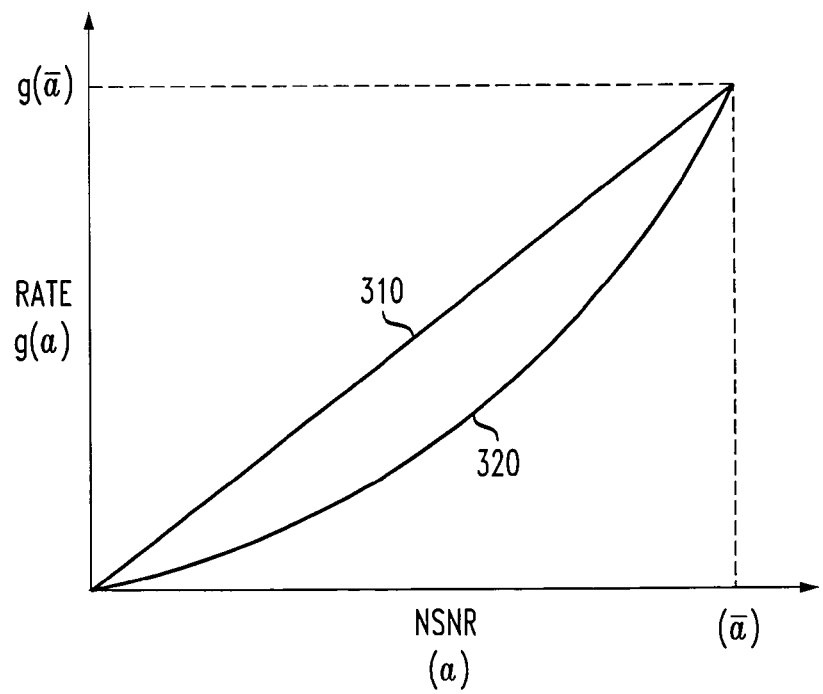
FIG. 3 is a graph of transmission rate of a mobile versus normalized signal to noise ratio (NSNR) for a fixed cumulative NSNR and for an orthogonality factor between one-half and one.

For any fixed value of $\Lambda$, which is known as the cumulative NSNR herein, Equations (10) and (11) have a simple "greedy" solution when $g_i(\cdot)$ is convex. An idea behind a procedure outlined below is illustrated in FIG. 3. FIG. 3 shows how rate varies with the NSNR. As can be seen, the rate curve 320 is convex. However, the rate curve 320 is replaced for many embodiments described below by straight line 310 that joins the endpoints. This is valid on account of the theorem described above, which implies that the $\alpha_i$ always take one of the bounding values (i.e., either zero or $\overline{\alpha}_i$) in the constraints of Equations (11) if the cumulative NSNR, $\Lambda$, is appropriately chosen.

An exemplary method, using the simplified rate curve of the straight line 310, to construct an optimal uplink scheduling solution is shown in FIG. 4. Method 400 shown in FIG. 4 is called the "optimal method" herein. Method 400 is used by a base station to determine uplink mobile rates and which mobiles should transmit during a time period.

Method 400 begins in step 410' when a cumulative NSNR, $\Lambda$, is chosen. Let $\overline{\alpha}_i = \min\{\Lambda, \overline{P}_i(1-\Lambda)\}$. In step 415, the mobiles are ordered according to decreasing value of the metric $$v_i = \frac{w_i}{\overline{\alpha}_i} g_i(\overline{\alpha}_i),$$

which is called the weighted marginal rate herein.

In step 420, the NSNR for the mobile with the best weighted marginal rate, which in this example is the highest weighted marginal rate, is assigned the highest NSNR for the mobile. In mathematical terms, assign $\alpha_i=\overline{\alpha}_i$ for the mobile with the highest value of $v_i$.

In step 425, the cumulative NSNR is updated as $\Lambda \rightarrow \Lambda - \overline{\alpha}_i$. The mobile ordering will not change if $\Lambda \ge \overline{P}_i(1-\Lambda)$ for all remaining mobiles (step 430=NO). Otherwise the mobiles should be reordered (step 430=YES) by recomputing the $v_i$ with the new $\Lambda$ (step 415). The cumulative NSNR is updated until reordering is needed or until the cumulative NSNR is zero, i.e., stop if $\Lambda=0$ and set $\alpha_i=0$ for all remaining mobiles (step 445).

In order to determine an optimal solution to Equations (8) and (9), all cumulative NSNR are searched over $\Lambda \epsilon [0,1]$ with sufficiently fine granularity. Thus, in step 450 it is determined if there are additional cumulative NSNRs to be searched. If so (step 450=YES), another cumulative NSNR is chosen in step 410; if not (step 450=NO), the method 400 ends in step 455 when the best objective function, i.e., Equation (10), is chosen for all of the cumulative NSNRs. In this example, the best objective function is the objective function with the highest value, although potentially objective functions to be minimized may be chosen.

Further, it is also clear from the original problem that $$\Lambda^* = \sum_{i \in S} \overline{P}_i (1 - \Lambda^*)$$

for the optimal value $\Lambda^*$, where S is the optimal transmitting set. Thus, the role of $\Lambda$ is mainly in ordering the mobiles in the best manner out of the N! possibilities, and once an ordering is chosen, it is simple to check the N different values $$\Lambda_k = \frac{\sum_{i \le k} \overline{P}_i}{1 + \sum_{i \le k} \overline{P}_i} \quad i \in \{1, \dots, N\}$$

for optimality. Further, an ordering change only takes place when $\Lambda = \Lambda_{ij}$ specified by the solution to $v_i = v_j$ for some $i \ne j$. This condition hence specifies at most N(N−1)/2 ordering changes out of the N! possibilities, some of which may not lie in [0,1] and can therefore be discarded. From these considerations, the following computationally simpler algorithm, shown in FIG. 5, can be devised.

As with method 400, method 500 of FIG. 5 is used by a base station to determine uplink mobile rates and to determine which mobiles should transmit during a time period. Method 500 is termed the "alternate optimal method" herein. Because method 500 only selects some of the cumulative NSNRs, method 500 is faster than method 400. Method 500 begins in step 510 when the cumulative NSNRs are computed and sorted. In other words, compute, and sort in increasing order, the $\Lambda_{ij}$ satisfying $v_i = v_j$ for some $i,j \in \{1, \dots, N\}$, $\Lambda_{ij} \in (0,1)$. Denote this list as $$\{\Lambda_k : m \in \{1, \dots, M\}\} \triangleq \{0, \Lambda_1, \dots, 1\}.$$

For each interval $[\Lambda_m, \Lambda_{m+1}]$ (step 515), determine the mobile ordering in some interior point, say the midpoint, according to decreasing values of $v_i$. The ordering is performed in step 520.

The objective function, i.e., Equation (8), is evaluated in step 525 for the current ordering by successively including mobiles from the top of the order. If there are more intervals (step 530=YES), the method 500 continues in step 515. If there are no more intervals to examine (step 530=NO), the best objective function is chosen over all the intervals and mobile sets examined (step 535).

The complexity of method 500 for N mobiles is O(N³log N), and should give the optimal uplink scheduling solution.

It should be noted that methods 400 and 500 can be modified to incorporate rate limits. The steps of methods 400 and 500 can be repeated when there are specified upper and lower bounds on individual mobile rates, i.e. $R_i^{min} \le R_i \le R_i^{max}$. This condition can be transformed to $\alpha_i^{min} \le \alpha_i \le \alpha_i^{max}$ using the functions $g_i(\cdot)$. The lower rate limits may arise due to real-time services, and the upper limits may arise from transmitter capabilities or current queue content. These limits further favor simultaneous transmission, and must be included in the formulation for QoS, and power efficiency reasons. The methods 400 and 500 and methods described below can accommodate rate limits in the optimization by modifying Equation (11) as $\alpha_i^{min} \le \alpha_i \le \min\{\overline{P}_i(1-\Lambda), \alpha_i^{max}\}$, but the somewhat more elaborate solution procedure will not be described here. Simple inspection reveals the changes necessary in the previous methods, which entail only a small computational overhead.

IV. Role of Partial Orthogonality in Uplink Scheduling

The effect is now considered of partial orthogonality in the Walsh codes, for CDMA systems, assigned to mobiles. This effect is traditionally modeled by means of an orthogonality factor, f, which specifies the fraction of power transmitted to other mobiles that appears as direct interference to a particular mobile. The SIR Equation (1) is then modified as the following:

$$\frac{P_i}{1 + f \sum_{j \in \{1, \dots, N\}, j \ne i} P_j} \ge \gamma_i. \qquad (12)$$

It can be seen that most of the previous analysis goes through unchanged if one sets $\gamma_i \to f\gamma_i$ and $(P_i, \overline{P}_i) \to (fP_i, f\overline{P}_i)$. Thus, the feasible SIR vectors are specified by the following modified version of Equation (6):

$$\sum_j \alpha_j + \frac{\alpha_i}{f\overline{P}_i} \le 1, \qquad (13)$$

with the $\alpha_i$ now defined as the following:

$$\alpha_i = \frac{f\gamma_i}{1 + f\gamma_i}.$$

Further, the optimization problem of Equations (8) and (9) changes to the following:

$$\max \sum_{i=1}^{N} w_i g_i(\alpha_i), \qquad (14)$$

subject to the following:

$$\sum_{j=1}^{N} \alpha_j + \frac{\alpha_i}{f\overline{P}_i} \le 1, \quad \alpha_i \ge 0 \quad \forall i, \qquad (15)$$

where $g_i(\cdot)$ now also depend on f. It is instructive to consider the Shannon formula, for which $$g(\alpha) = \beta \log\left[1 + \frac{\alpha}{f(1-\alpha)}\right].  \quad (16)$$

Figure 6:
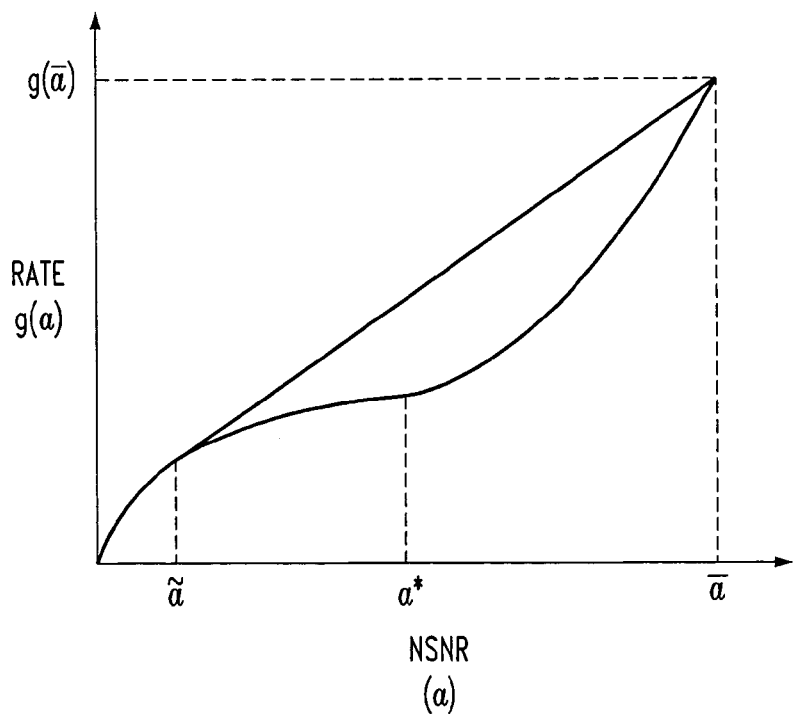
FIG. 6 is a graph of transmission rate of a mobile versus NSNR for a fixed cumulative NSNR and for an orthogonality factor greater than zero but less than one-half.

The feature that impacts scheduling in this case is that $g(\alpha)$ is convex for $f\in[0.5,1]$, but not so for $f\in[0,0.5)$. In the latter case, $g(\alpha)$ begins as a concave increasing curve and has an inflexion point given by $\alpha^*=(1-2f)/[2(1-F)]$ where convexity sets in. This is shown in FIG. 6. The effect of this on scheduling is to favor simultaneous transmission of mobiles, and at power levels smaller than the peak. This is due to the fact that concave maximization problems typically have their optima in the interior of the feasible region. It seems reasonable that other choices of the function $g_i(.)$ will reveal similar traits, since reducing f to very small values eliminates interference, and eventually favors simultaneous transmission by all mobiles in an interference-free manner.

The optimal scheduling methods 400 and 500 discussed earlier continue to apply for $f\in[0.5,1]$ since $g(\cdot)$ is still convex in this range for the Shannon rate formula. In the following, the problem of optimal scheduling is addressed for $f\in[0,0.5)$. FIG. 6 shows the following critical values of $\alpha$ which will be used in the solution procedure discussed later: the upper limit for each mobile is $$\overline{\alpha}_i \triangleq \min(\Lambda, f\overline{P}_i(1-\Lambda), \alpha_i^{\max});$$

the inflection point is $$\alpha^* \triangleq (1-2f)/[2(1-f)];$$

and the critical tangent originating at $\tilde{\alpha}$ is obtained by solving the following:

$$\frac{g(\overline{\alpha}) - g(\tilde{\alpha})}{\overline{\alpha} - \tilde{\alpha}} = \frac{dg}{d\alpha}\bigg|_{\tilde{\alpha}}.$$

The method to obtain the optimum for given $\Lambda$ is shown in FIG. 7. FIG. 7 is used by a base station to determine mobile rates and which mobiles should transmit during a time period when the orthogonality factor is $f\in[0,0.5)$. The method 700 proceeds as follows. In step 710, a cumulative NSNR is selected.

The critical values of $\alpha^*, \overline{\alpha}_i, \tilde{\alpha}_i$ are computed in step 715 for the selected value of $\Lambda$. In step 720, the mobiles are divided into 2 classes. The first class, "Class I," has $\{i: \overline{\alpha}_i \leq \alpha^*\}$. These mobiles have $\tilde{\alpha}_i = \overline{\alpha}_i$. The second class, "Class II," has $\{i: \overline{\alpha}_i > \alpha^*\}$. These mobiles have $\tilde{\alpha}_i < \alpha^* < \overline{\alpha}_i$.

In step 725, it is determined if Class II is empty. If Class II is empty (step 725=YES), all mobiles operate in the concave portion of their curves, which leads to a standard concave maximization problem (step 730) with a Lagrange multiplier solution specified as follows: set $\alpha_i(\lambda) = \min(\overline{\alpha}_i, \alpha_i^c)$, where $\alpha_i^c$ is the solution to $$\frac{dg_i}{d\alpha_i}\bigg|_{\alpha_i^c} = \lambda;$$

$\lambda$ is then determined by solving $$\sum_i \alpha_i(\lambda) = \Lambda.$$

If Class II is non-empty (step 725=NO), pick the mobile i* with the largest value of the weight measure $$w_i \triangleq Q_i \frac{dg}{d\alpha}\bigg|_{\tilde{\alpha}}$$

(step 735) and set $\alpha_{i^*} = \overline{\alpha}_{i^*}$ (step 755). Set $\Lambda \leftarrow \Lambda - \alpha_{i^*}$ in step 755.

The above steps then should to be repeated over a set of values of $\Lambda$ to obtain the best final objective. Thus, in step 765, if there are more cumulative NSNRs to be examined (step 765=YES), method 700 continues in step 710; otherwise (step 765=NO), the method 700 ends in step 770 when the best objective function is chosen. Clearly, this method 700 is more computationally intensive compared to the $f\in[0.5,1]$ case, and the method 700 is included here for completeness. In practice, most codings employed result in $f\approx0.6$, and the simpler solution (i.e., either optimal or sub-optimal, described below) applies. Even for this easier case, however, the optimal solutions to uplink scheduling may be too burdensome and computationally intensive to use in certain practical applications. Hence, the following sections describe simpler approximations to the optimal solutions, where the simpler approximations are motivated by the structure of the optimal solution and demonstrate comparable performance.

V. Low-Complexity Approximation Techniques

In this part, the orthogonality factor is restricted to the $f\in[0.5,1]$ case, and a number of greedy, low-complexity, approximate solutions are provided to the convex maximization discussed before.

A. QRP Method

This section describes a method referred to as the "QRP method" herein. Recall that the sorting measure used in the optimal solution (see FIG. 4 and, in particular, step 415) for fixed $\Lambda$ was of the form $v_i = Q_i g_i(\alpha_i)/\overline{P}_i$, where in this case the queue length, $Q_i$, replaces the weights, $w_i$, and the peak received power of a mobile, $\overline{P}_i$, replaces the highest NSNR, $\overline{\alpha}_i$, for the mobile. The form of $v_i = Q_i g_i(\alpha_i)/\overline{P}_i$ suggests a greedy algorithm that ranks mobiles by the same measure without $\Lambda$. A simple scheduling method, which may be more suitable for practical implementation, is shown in FIG. 8. Method 800 shown in FIG. 8 is called the "QRP method" herein.

The QRP method 800 begins in step 810, when mobiles are sorted in decreasing order of the weighted marginal rate, $$v_i = \frac{Q_i R_i^0}{\overline{P}_i},$$

assuming no interference from other mobiles while computing $R_i^0$, so that $R_i^0$ is the transmission rate for a mobile with no interference from other mobiles. In step 815, the mobile i, in order starting from the top of the list, is added to a new list while maintaining and updating the value of the objective function, $$O \triangleq \sum_{j<i} Q_i R_i$$

(step 825), for the added mobiles, where the $R_i$ used in step 825 now takes into account interference from all added mobiles (step 820).

If adding the next mobile to the new list does not reduce the objective function, O, (step 830=NO), another mobile is added in step 815. If adding the next mobile does reduce the objective function, O, (step 830=YES), the previously added mobile is removed from the new list of added mobiles. The remaining mobiles on the new list then transmit at their peak powers and rates as computed.

This simple method 800 captures most of the benefits of optimal uplink scheduling, and has the properties alluded to above. In other words, the chosen mobile sets from the above algorithm tend to be one of the following types: (1) a single "strong" mobile with high $\overline{P}_i$; or (2) a group of "weak" mobiles with low $\overline{P}_i$, and often high $Q_i$. This observation is consistent with the common intuition relating to the nature of interference in CDMA systems. In "Uplink Scheduling in CDMA Systems," incorporated by reference above, simulations show that the simple method 800 provides improved performance over conventional scheduling techniques.

B. The Uplink Proportional Fair Method

The conventional proportional fair (PF) scheduling method was proposed and implemented by QualComm for third generation (3G) 1X Enhanced Voice Data Optimized (EVDO), High Data Rate, downlink. The conventional PF algorithm provides fairness among mobiles such that in the long run each mobile receives the same number of time periods of service. At the same time, conventional PF also takes advantage of channel variations (e.g., mobile diversity).

However, since conventional PF schedules mobiles one-at-a-time, it is not well suited to uplink scheduling. The "uplink" PF (UPF) method described in FIG. 9 has a benefit of the QRP method, which is to allow a single "strong" mobile or a group of "weak" mobiles to transmit.

The UPF method 900 of FIG. 9 is used by a base station to determine an approximate solution to uplink scheduling. Method 900 begins in step 910 when mobiles are sorted in decreasing order of the weighted marginal rate, $$v_i = \frac{R_i^0}{\overline{R}_i},$$

assuming no interference from other mobiles while computing $R_i^0$ (i.e., the transmission rate for a mobile with no interference from other mobiles). $\overline{R}_i$ is the average rate of mobile i, updated through a low pass filter in each scheduling interval. The latter is described in, for instance, A. Jalali et al., "Data Throughput of CDMA-HDR a High Efficiency-High Data Rate Personal Communication Wireless System," in Proc. of IEEE VTC, vol. 3 (2000), the disclosure of which is hereby incorporated by reference.

In step 915, the mobile i, in order starting from the top of the list of weighted marginal rates, is added to a new list of mobiles while maintaining and updating the value of the objective function, $$O \triangleq \sum_{j<i} R_i,$$

(step 925) where $R_i$ takes into account interference from all added mobiles. The new $R_i$ is calculated in step 920.

If the objective function, O, does not decrease (step 930=NO), then the method 900 continues in step 915. If the objective function, O, does decrease (step 930=NO), then the previously added mobile is removed from the new list. All remaining mobiles on the new list transmit at their peak powers and rates as computed.

C. Other Sub-Optimal Techniques

A number of other sub-optimal algorithms, which generally perform less well than the above proposed QRP method, will now be described. However, these sub-optimal methods offer simplicity in implementation by using less processing and signaling power. One example of a method that performs less well in simulations than the QRP method described above is termed an "Average-SIR" method herein. In the Average-SIR method, the average SIR, $\gamma_{avg}$, is calculated among all mobiles with non-empty queues. There are two ways to compute mobiles SIR at this stage: (1) assume mobiles with non-empty queues transmit one-at-a-time; or (2) assume mobiles with non-empty queues transmit simultaneously.

The second approach is chosen herein since it gives clearer difference between "strong" mobiles and "weak" mobiles. Another reason is that it takes coexistence (namely, the orthogonalization factor) into consideration. Then a well known MaxQR algorithm is applied to the group of mobiles below average SIR and each mobile above average SIR. The detailed steps are listed below and illustrated in FIG. 10.

Average-SIR method 1000 of FIG. 10 is used by a base station to determine uplink rates. Method 1000 begins in step 1010 when the group of mobiles below average SIR is denoted as a set (called "B" herein). In step 1025, the rates of mobiles belonging to B (only mobiles in B will transmit simultaneously) are recomputed. In step 1020, the group of mobiles above average SIR are denoted as a set (called "C" herein). In step 1025, the rates of mobiles belonging to C (mobiles in C will transmit one-at-a-time) are recomputed.

In step 1030, the objective function for the mobiles in B is determined as follows:

$$\text{let } q_r[0] = \sum_{i \in B} Q_i R_i.$$

For the ith mobile (i starts at 1) in C, let $q_r[i]=Q_i R_i$.

In step 1035, the objective function for each mobile in the second set is determined. In step 1040, the mobile or mobiles selected to transmit are determined by argmax$_i q_r[i]$, i=0,1, 2,...,N. If i=0, serve all mobiles in B. Otherwise, serve one mobile in C with maximum queue length and data rate product.

Note that one could also replace the average SIR in the above algorithm by other quantities, for example, data rate or received power. The performance is similar.

VI. Successive Interference Cancellation (SIC) Techniques

In this section, optimal scheduling is examined for uplink mobile transmissions in a single CDMA cell with Successive Interference Cancellation (SIC) employed at the base-station. SIC is a well-known technique in the context of multi-user detection. For instance, see P. Patel et al., "Analysis of a Simple Successive Interference Cancellation Scheme in a DS/CDMA System," IEEE Journal on Selected Areas in Comm., vol. 12, no. 5 (1994) and S. Verdu, "Multiuser Detection," Cambridge University Press (1998), the disclosures of which are hereby incorporated by reference. SIC involves decoding a mobile after subtracting out the interference from all previously decoded mobiles, thus making the current mobile immune to the previously decoded mobiles. It has been shown that the performance of SIC is mainly determined by mobile decoding order. Patel and Verdu also pointed out that mobiles with high received power at the base will more likely decode correctly, hence they will benefit most from SIC. Scheduling with SIC has been analyzed in G. Caire et al., "Achievable Rates in Multi-Antenna Broadcast," Allerton Conference (2000), the disclosure of which is hereby incorporated by reference, and related work from an information theoretic point of view for given traffic and channel statistics and constraints on average power consumption.

In this section, scheduling with SIC is analyzed more from a system queuing stability or QoS point of view without any assumptions on mobile channels or traffic statistics, and with instantaneous transmit power constraints for each mobile. Alternatively, instantaneous (e.g., short-term) feedback information is assumed in the form of queue lengths or delays for mobiles and channel state inferred from received power. These constraints better reflect wireless systems and devices used today.

An important observation in the sections above is that simultaneous transmission by "weak" mobiles, time-shared with one-at-a-time transmission by "strong" mobiles can lead to improvements in both capacity and fairness. Further, it has been observed that an introduction of an orthogonality factor $f\in[0,0.5]$, which reflects high degree of interference suppression among mobiles, favors more simultaneous transmission. A similar conclusion seems plausible with SIC, which is a specific method of interference suppression. In fact, it will be shown that under the assumptions given below, the throughput optimal scheduling algorithms favor completely simultaneous transmission by all backlogged mobiles, who are only differentiated by the order in which they are decoded. Assuming perfect decodability, this ordering also turns out to be particularly simple, suggesting that this method is easily implemented in practical systems. This method is described below in reference to FIG. 11.

It should be noted that perfect decodability is unlikely in practical wireless systems, and the best mobile ordering could be complicated if decoding error is taken into account. Combining the observation that strong mobiles benefit the most from SIC, a hybrid scheduling scheme (see FIG. 12) is described below that performs SIC for strong mobiles while letting weak mobiles transmit simultaneously. The former is because strong mobiles are generally immune to decoding errors, while the latter is motivated by the observation that simultaneous transmission without SIC is beneficial for weak mobiles (as shown above).

It can be shown that both methods described below improve system performance, especially for the weak mobiles, in terms of reduced decoding errors.

This section begins with the derivation of the throughput optimal scheduling with SIC. Then the descriptions for the optimal scheduling method (called the "SICQ" method) and the hybrid method are presented.

Now consider the effect of SIC on scheduling. This problem has been studied in D. Tse, "Optimal Power Allocation over Parallel Gaussian Broadcast Channels," Proc. of Int'l Symposium on Information Theory (1997), the disclosure of which is hereby incorporated by reference, for the downlink broadcast channel from the point of view of maximizing a weighted sum of mobile rates subject to constraints on long-term average power consumption. In Tse, it is assumed that the mobiles have pre-specified channel statistics. Here, SIC for the uplink multi-access channel is focused on, as is achieving stability of the mobile queues, or satisfying QoS for mobiles, with just instantaneous channel conditions from feedback. No assumption is made about long-term channel statistics, and the constraints considered are limits on the instantaneous transmit power. With SIC, the SIR equation of the individual mobiles for a given decoding order may be written as:

$$\frac{P_i}{\sum_{j<i} P_j + 1} = \gamma_i \quad i = 1, 2, \ldots, N, \tag{10}$$

where it is implicitly assumed that the mobiles are ordered in some specific way. Note that the ordering is a crucial aspect of SIC, since it plays an important role in determining the mobiles target received powers through Equation (10). The ordering chosen above determines the decoding order of mobiles at the base-station, which is the inverse order $N, \ldots, 2, 1$.

As described above, SIC involves decoding the next mobile after subtracting out the interference from all previously decoded mobiles, thus making this mobile immune to the previously decoded mobiles. As before, the feasible region of Equation (10) is first derived to help formulate and solve the problem. Define $$S_i \triangleq \sum_{j=1}^{i} P_j$$

to rewrite Equation (10) as the following:

$$\frac{S_i - S_{i-1}}{S_{i-1} + 1} = \gamma_i \quad i = 1, 2, \ldots, N, \tag{11}$$

which leads to the identity $s_i=\gamma_i+(1+\gamma_i)S_{i-1}$, i.e., $1+S_i=(1+\gamma_i)(1+S_{i-1})$. From these identities, it is clear that Equations (10) and (11) can be explicitly solved as the following:

$$1+S_i = \prod_{j=1}^{i}(1+\gamma_j) \quad i=1,2,\ldots,N, \tag{12}$$

which leads to the following:

$$P_i = S_i - S_{i-1} = \gamma_i \prod_{j=1}^{i-1}(1+\gamma_j) \quad i=1,2,\ldots,N. \tag{13}$$

For feasibility under given instantaneous power constraints, $0 \leq P_i \leq \overline{P}_i$ is required, which then leads to the final feasibility condition that follows:

$$\gamma_i \prod_{j=1}^{i-1}(1+\gamma_j) \leq \overline{P}_i \quad i=1,2,\ldots,N. \tag{14}$$

As before, the scheduling problem is then stated as the following:

$$\max_{\gamma} \sum_{i=1}^{N} Q_i R_i, \tag{15}$$

where $R_i = f(\gamma_i)$, subject to the feasibility constraints in Equation (14). The analytical results below assume the Shannon formula $$R_i \triangleq \beta \log(1+\gamma_i).$$

With some modification of the methods, certain other choices $f(.)$ can be used, but the nature of the optimal schedule derived below might not hold in general. In terms of the $S_i$, the optimization problem is then the following:

$$\max \sum_i Q_i \log\left(1+\frac{S_i-S_{i-1}}{1+S_{i-1}}\right), \tag{16}$$

subject to $S_i - S_{i-1} \leq \overline{P}_i$ for $i=1,2,\ldots N$. Using other functions $f(.)$ for the rate-SIR relationship preserves tractability of the problem for a fixed mobile ordering if $$f\left(\frac{S_i-S_{i-1}}{1+S_{i-1}}\right)$$

is jointly concave in $S_i$ and $S_{i-1}$, but the solution is in general not explicit. With the Shannon formula, a surprisingly simple solution can be obtained, that is derived below. The objective function in Equation (16) can be rewritten as the following:

$$\sum_i Q_i \log\left(1+\frac{S_i-S_{i-1}}{1+S_{i-1}}\right) = \sum_i (Q_i - Q_{i+1})\log(1+S_i) \tag{17}$$

$$= \sum_i Q_i \log\left(\frac{1+S_i}{1+S_{i-1}}\right),$$

with the convention $S_0=0=Q_{N+1}$. Recall that the optimal ordering of the mobiles is part of the problem, and still remains to be determined. To maximize Equation (16), one may now invoke the polymatroid structure of the rate region of SIC, as described in Tse, but a simple proof is given below for completeness. It can be proven that the optimal mobile order for the solution of Equation (16) is given by the condition $Q_1 \geq Q_2 \geq \ldots \geq Q_N$. For instance, consider two consecutive mobiles in given ordering with queue lengths $Q_i, Q_{i+1}$ and received powers $P_i, P_{i+1}$, respectively. Assume that $Q_j, P_j, j=1,2,\ldots,N$ are fixed and given, and the only unknown is the mobile ordering. The contribution of these two mobiles to the objective function in Equation (16) is given by the following:

$$Q_i \log\left(1+\frac{P_i}{1+S_{i-1}}\right) + Q_{i+1}\log\left(\frac{P_{i+1}}{1+S_{i-1}+P_i}\right).$$

Note that the reordering of these two mobiles does not affect $S_j$, $j \neq i, i+1$ and hence the remaining terms in the objective are unaffected by the reordering. To evaluate the gain in the objective value from the reordering, consider the difference as shown below:

$$Q_i \log\left(1+\frac{P_i}{1+S_{i-1}}\right) + Q_{i+1}\log\left(1+\frac{P_{i=1}}{1+S_{i-1}+P_i}\right) -$$
$$Q_{i+1}\log\left(1+\frac{P_{i+1}}{1+S_{i-1}}\right) + Q_i\log\left(1+\frac{P_i}{1+S_{i-1}+P_{i+1}}\right) =$$
$$(Q_i - Q_{i-1})\log\left[\frac{(1+S_{i-1}+P_i)(1+S_{i-1}+P_{i+1})}{(1+S_{i-1})(1+S_{i-1}+P_i+P_{i+1})}\right].$$

The latter expression is obtained by simple algebraic manipulation, and is non-negative only if $Q_i \geq Q$. This shows that the objective can be increased for any given fixed values of $Q_j, P_j, j=1,2,\ldots,N$, by interchanging mobiles i and i+1 if $Q_i < Q_{i+1}$. By induction, this argument continues to hold for multiple mobiles, culminating in the optimality of the claimed ordering $Q_1 \geq Q_2 \geq \ldots \geq Q_N$.

In light of this result, it is assumed that $Q_1 \geq Q_2 \geq \ldots \geq Q_N$ in the following. The optimization problem is now the following:

$$\max \sum_i (Q_i - Q_{i+1})\log(1+S_i),$$

subject to the following:

$$S_i - S_{i-1} \leq \overline{P}_i \; i=1,2\ldots,N.$$

It can be seen that, for the optimal ordering, the objective is monotonously increasing in each $S_i$, and it is hence optimal to choose $$S_i = \sum_{j=1}^{i} \overline{P}_i,$$

i.e., all mobiles transmit at full power. Throughput optimal uplink scheduling with SIC, called the "SICQ method" herein, hence involves the following steps for each scheduling interval.

Figure 11:
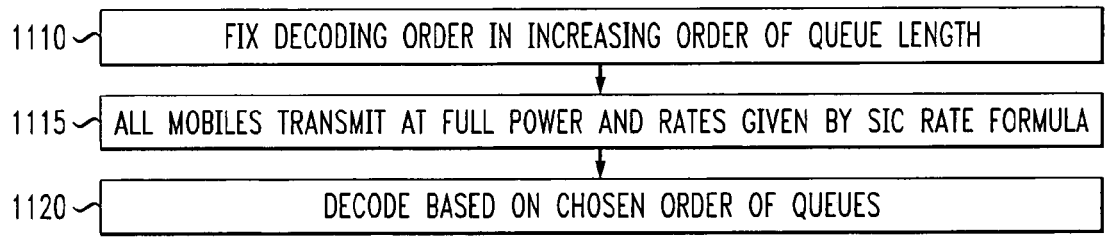
FIG. 11 is a flow chart of an exemplary successive interference cancellation (SIC) queue method that determines uplink mobile rates and produces an approximate solution for the uplink mobile rates, in accordance with a preferred embodiment of the invention.

The SICQ method 1100 is shown in FIG. 11. Method 1100 is performed by a base station using SIC in order to decode mobiles. Method 1100 begins when the mobiles are ordered based on increasing order of queue length, so that $Q_1 \geq Q_2 \geq \ldots \geq Q_N$. In other words, in step 1110, the decoding order is fixed based on the increasing order of queue length. In step 1115, all mobiles transmit at full power and rates given by $R_i = f(\gamma_i)$ where $$\gamma_i = \frac{\overline{P}_i}{1 + \sum_{j<i} \overline{P}_j}.$$

In step 1120, the mobiles are decoded at the base station in the chosen Q order (i.e., $Q_1 \geq Q_2 \geq \ldots \geq Q_N$).

Note that the above method in FIG. 11 is much simpler than scheduling without SIC, as described above, and extends to all f(.) that satisfy the following reordering property:

$$Q_i f\left(\frac{\overline{P}_i}{1 + \sum_{j<i} P_j}\right) + Q_{i+1} f\left(\frac{\overline{P}_{i+1}}{1 + \sum_{j \leq i} P_j}\right) \geq$$

$$Q_{i+1} f\left(\frac{P_{i+1}}{1 + \sum_{j<i} P_j}\right) + Q_i f\left(\frac{P_i}{1 + \sum_{j<i} P_j + P_{i+1}}\right)$$

if $Q_i \geq Q_{i+1}$ for any fixed $Q_j, P_j, j=1,2,\ldots,N$.

The above analysis ignores decoding errors, which is a reasonable assumption for strong mobiles. In practice, "weak" mobiles with low received power do not benefit much from SIC on account of significant decoding errors. As a result, SIC is most effective for the "strong" mobiles. Thus, to get the best possible advantages from SIC, it is desirable to perform SIC only for the "strong" mobiles, and allow simultaneous transmission without SIC for "weak" mobiles. However, to maximize the throughput of the weak mobiles, it is advantageous to perform multi-user detection (MUD), as described in Verdu, which relies on "soft" decoding to minimize error probabilities. As is known in the art, multi-user detection is an advanced signal processing technique that takes advantage of "soft" decoding output from multiple received signals and combines many such samples of user outputs to obtain the best possible decoding performance. Correlations in user signals over time play a major role in the performance of MUD. In this sense, MUD is a more sophisticated and complex decoding technique compared to SIC or matched filtering, both of which treat MAI (Multi-Access Interference) as noise to a particular user. More information on MUD is presented in Verdu, which has already been incorporated by reference above. It is assumed that a MUD method performs well enough for weak mobiles so as to provide service with negligible error rates.

Figure 12:
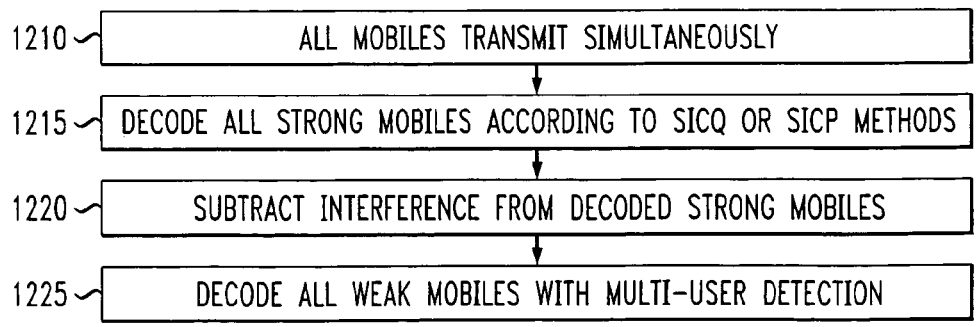
FIG. 12 is a flow chart of an exemplary SIC method that determines uplink mobile rates and produces an approximate solution for the uplink mobile rates, in accordance with a preferred embodiment of the invention.

Based on these observations, the "hybrid" scheduling method 1200 (called the HYSICP/HYSICQ method herein) shown in FIG. 12 is proposed. Method 1200 is performed by a base station 103 using SIC in order to decode mobiles.

Method 1200 begins when all mobiles transmit simultaneously in each time period. All mobiles transmit at maximum power. As mentioned earlier, past conventional techniques suggest scheduling the mobiles purely based on received power. The conventional techniques will be called "SICP methods" herein. In step 1215, all strong mobiles are decoded according to the SICP method or the SICQ method (FIG. 11). A reasonable threshold (say 0 dB) on either received SIR or received power can be used to distinguish strong mobiles from weak mobiles.

In step 1220, interference is subtracted from all decoded strong mobiles.

In step 1220, all weak mobiles are decoded with a MUD method.

The proposed HYSICP/HYSICQ of FIG. 12 combines the gain of SIC for strong mobiles while weak mobiles are decoded with MUD after eliminating interference from strong mobiles, who are reliably decoded with SIC. Method 1200 is expected to perform better than pure SIC when decoding errors in SIC are significant. Additionally, it would be beneficial to take into account actual decoding error probabilities for SIC, which depends on the implementation. Thus, it would be beneficial to classify strong users as "correctly decodable with high probability using SIC." Those mobiles that have less probability for being correctly decoded using SIC can be decoded via MUD. Thus, a threshold for probability may be used to determine strong and weak users. However, using received SIR or received power can act as an estimate of the probability of being correctly decoded, as high received power or received SIR mobiles are more likely to be decoded correctly. It should be noted that all mobiles could be above, or below, the threshold used to classify the mobiles as strong or weak mobiles.

It is to be understood that the embodiments and variations shown and described herein are merely illustrative of the principles of this invention and that various modifications may be implemented by those skilled in the art without departing from the scope and spirit of the invention. For instance, embodiments of the present invention can be implemented at least in part to utilize elements of a mobile switching center or a server coupled to one or more mobile switching centers or base stations. In addition, the various assumptions made herein are for the purposes of simplicity and clarity of illustration, and should not be construed as requirements of the present invention.

We claim:

1. A method for uplink scheduling in a wireless network, comprising the steps of:
   sorting a plurality of mobiles requesting transmission for a given time period based at least in part on a first metric;
   selecting one or more of the sorted mobiles;
   determining a second metric based on one or more properties of the selected one or more sorted mobiles; and
   selecting which mobile or mobiles are to transmit during the time period based on the second metric.

2. The method of claim 1, wherein:
the step of sorting the plurality of mobiles further comprises sorting the plurality of mobiles according to values of the first metric;
the step of selecting one or more of the sorted mobiles further comprises selecting a sorted mobile with a best value of the first metric, wherein the selected sorted mobile has not been previously selected;
the step of selecting which mobile or mobiles are to transmit during a time period based on the second metric further comprises the step of performing, until the second metric decreases, the step of selecting a sorted mobile with a best value of the first metric and the step of determining a second metric; and
the step of selecting which mobile or mobiles are to transmit further comprises the step of selecting the sorted mobiles that did not cause the second metric to decrease.

3. The method of claim 1, further comprising the step of sending, to the mobile or mobiles selected to transmit, a message indicating permission to transmit.

4. The method of claim 1, further comprising the step of determining a rate of transmission for each of the mobiles selected to transmit during the given time period.

5. The method of claim 1, wherein the first metric comprises a weighted marginal rate and wherein the second metric comprises an objective function.

6. The method of claim 5, wherein weights used in the weighted marginal rate comprise at least one of queue length and delay.

7. The method of claim 5, wherein the weighted marginal rate comprises peak received power for a mobile, wherein the peak received power is related to maximum transmit power for a mobile, and wherein the maximum transmit power for a mobile is received from a mobile or estimated.

8. The method of claim 5, wherein at least one mobile has a lower transmission rate limit, an upper transmission rate limit, or both the lower and the upper transmission rate limits, wherein the weighted marginal rate is proportional to a rate function, and wherein the rate function is limited by any transmission rate limit for the at least one mobile.

9. The method of claim 5, further comprising the steps of (1) performing the steps of sorting, selecting one or more of the sorted mobiles, determining, and selecting which mobile or mobiles are to transmit for each of a plurality of fixed values, wherein each of the fixed values corresponds to a weighted marginal rate and a value of an objective function, and (2) selecting a best value of an objective function corresponding to one of the plurality of fixed values.

10. The method of claim 9, wherein each of the fixed values is a cumulative normalized signal to noise ratio (NSNR) and wherein the step of selecting a best value for an objective function further comprises the step of selecting an objective function having a largest value of the plurality of objective functions corresponding to the plurality of fixed values.

11. The method of claim 5, wherein:
the weighted marginal rate is based on a weight for a mobile, a highest normalized signal to noise ratio (NSNR) of the mobile, and a transmission rate for the mobile occurring when the mobile transmits at the highest NSNR; and
the objective function is a sum for all mobiles of a product of a weight for a mobile and the transmission rate of the mobile.

12. The method of claim 5, further comprising the steps of:
determining a plurality of fixed values meeting a predetermined criterion, wherein each two of the plurality of fixed values defines an interval, and wherein there are a plurality of intervals;
for each interval, performing the steps of sorting a plurality of mobiles, selecting one or more of the sorted mobiles, determining a second metric, and selecting which mobile or mobiles are to transmit; and
selecting a best value for an objective function from the intervals.

13. The method of claim 12, wherein each fixed value comprises a cumulative normalized signal to noise ratio (NSNR) and wherein the predetermined criterion comprises the condition that the weighted marginal rate for a mobile matches the weighted marginal rate for a different mobile.

14. The method of claim 5, wherein:
the weighted marginal rate is based on a queue length of a mobile, a transmission rate of the mobile assuming no interference from other mobiles, and a peak received power for the mobile; and
the objective function is based on a sum of a product of a transmission rate for each mobile assuming interference from selected sorted mobiles and a queue length for each mobile.

15. The method of claim 5, wherein:
the step of sorting a plurality of mobiles comprises the step of sorting a plurality of mobiles in decreasing order of weighted marginal rate while assuming no interference between mobiles;
the step of selecting one or more sorted mobiles further comprises the step of selecting a mobile having a highest weighted marginal rate, wherein the selected mobile has not been previously selected;
the step of determining a second metric further comprises determining a value for the objective function, wherein the objective function incorporates interference from all selected sorted mobiles; and
the step of selecting which mobile or mobile are to transmit further comprises the steps of (1) performing the steps of selecting a mobile having a highest weighted marginal rate and determining a value for the objective function until the objective function begins to decrease and (2) selecting the sorted mobiles that did not cause the objective function to decrease.

16. The method of claim 15, wherein each weighted marginal rate is based on a queue length of a mobile, a transmission rate of a mobile assuming no interference between mobiles and a peak received power of a mobile, and wherein the objective function is based on the sum of a product of queue length for a mobile and a transmission rate of a mobile assuming interference from selected sorted mobiles.

17. The method of claim 15, wherein each weighted marginal rate is based on a transmission rate of a mobile assuming no interference from other mobiles and an average transmission rate of a mobile, and wherein the objective function is based on a sum of a transmission rate for each mobile assuming interference from sorted mobiles used to determine the objective function.

18. The method of claim 1, wherein the first metric is a weight and the second metric is an objective function, wherein an orthogonality factor is between zero and one-half, the orthogonality factor specifying a fraction of power transmitted to other mobiles that appears as direct interference to a particular mobile.

19. The method of claim 18, wherein:
the method further comprises the steps of determining an upper limit, inflection point and critical tangent, separating mobiles into two classes based on the upper limit, inflection point, and critical tangent, and performing, for a number of fixed values, the steps of selecting one or more of the sorted mobiles and determining a second metric; and
the step of selecting which mobile or mobiles are to transmit further comprises the steps of selecting a best value of an objective function for the plurality of fixed values and selecting which mobile or mobiles are to transmit based on the objective function corresponding to the best value and a set of sorted mobiles corresponding to the objective function corresponding to the best value.

20. The method of claim 1, wherein the second metric is an objective function, the step of sorting a plurality of mobiles further comprises separating mobiles into groups based on the first metric, wherein a first group comprises mobiles having values of the fist metric above a predetermined value and a second group comprises mobiles having values of the first metric below a predetermined value, wherein the step of determining a second metric comprises the steps of determining a value of the objective function for all mobiles in the second group and determining a value for the objective function for each of the mobiles in the first group, and wherein the step of selecting which mobile or mobiles are to transmit further comprises the steps of selecting a highest value of the values for the objective functions and determining the mobile or mobiles corresponding to the highest value.

21. The method of claim 20, wherein the first metric comprises at least one of average signal to interference ratio (SIR), data rate, and received power.

22. An apparatus for uplink scheduling in a wireless network, comprising:
a memory; and
at least one processor, coupled to the memory, and operative to:
sort a plurality of mobiles requesting transmission for a given time period based at least in part on a first metric;
select one or more of the sorted mobiles;
determine a second metric using the selected one or more sorted mobiles; and
select which mobile or mobiles are to transmit during the time period based on the second metric.

23. An article of manufacture for uplink scheduling in a wireless network, comprising a machine readable medium containing one or more programs which when executed implement the steps of:
sorting a plurality of mobiles requesting transmission for a given time period based at least in part on a first metric;
selecting one or more of the sorted mobiles;
determining a second metric using the selected one or more sorted mobiles; and
selecting which mobile or mobiles are to transmit during the time period based on the second metric.

24. A method for uplink scheduling in a wireless network using successive interference cancellation (SIC), the method comprising the steps of:
fixing a decoding order based on queue length for at least two mobiles of a plurality of mobiles; and
decoding the at least two mobiles based on the fixed decoding order.

25. The method of claim 24, wherein the decoding order is based on increasing order of queue length.

26. The method of claim 24, wherein each mobile transmits at maximum power.

27. The method of claim 24, further comprising the steps of determining a transmission rate for each mobile and informing each mobile of the determined transmission rate for the mobile.

28. The method of claim 24, wherein each mobile transmits at rates given by $R=f(\gamma_i)$, where $R_i$ is a rate for a mobile, $\gamma_i$ is a signal to interference ratio (SIR) for a mobile and $f(\gamma_1)$ is a function of the SIR.

29. The method of claim 28, wherein $f(\gamma_i)=\beta\log(1+\gamma_i)$ and wherein $\beta$ is a bandwidth.

30. The method of claim 24, wherein the at least two mobiles are all of the plurality of mobiles.

31. A method for uplink scheduling in a wireless network using successive interference cancellation (SIC), the method comprising the steps of:
classifying any mobiles having a property above a predetermined threshold as being first mobiles and any mobiles below the predetermined threshold as being second mobiles;
decoding information from the first mobiles with a first decoding method;
subtracting interference from the first mobiles; and
decoding information from the second mobiles with a second decoding method, wherein the step of subtracting interference is performed prior to the step of decoding information from the second mobiles, and wherein the first and second decoding methods are different.

32. The method of claim 31, wherein the property comprises at least one of a probability of being correctly decoded, a received power, and a received signal to interference ratio.

33. The method of claim 31, wherein the first method is selected from at least one of a method using power order to provide decoding order and a method using queue length to provide decoding order, and wherein the second method is multi-user detection.

34. The method of claim 31, wherein each mobile transmits at maximum power.

35. The method of claim 31, further comprising the steps of determining a transmission rate for each mobile and informing each mobile of the determined transmission rate for the mobile.

* * * * *